United States Patent
Rodriguez et al.

(10) Patent No.: US 7,103,358 B2
(45) Date of Patent: Sep. 5, 2006

(54) OVERLAY CALLING PLAN FOR WIRELESS TELEPHONE

(75) Inventors: Herman Rodriguez, Austin, TX (US); Newton James Smith, Jr., Austin, TX (US); Clifford Jay Spinac, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 232 days.

(21) Appl. No.: 10/718,298

(22) Filed: Nov. 20, 2003

(65) Prior Publication Data

US 2005/0113091 A1    May 26, 2005

(51) Int. Cl.
  *H04Q 7/20*    (2006.01)
(52) U.S. Cl. ............... 455/432.3; 455/432.1; 455/406; 455/435.1; 455/433
(58) Field of Classification Search ........ 455/433, 455/406, 405, 435.1, 445, 432.3, 432.1
See application file for complete search history.

(56) References Cited

U.S. PATENT DOCUMENTS

| | | | |
|---|---|---|---|
| 4,916,728 A | | 4/1990 | Blair |
| 5,442,806 A | | 8/1995 | Barber et al. |
| 5,862,471 A | * | 1/1999 | Tiedemann et al. ........ 455/406 |
| 6,253,081 B1 | * | 6/2001 | Koster ........................ 455/433 |
| 6,560,455 B1 | | 5/2003 | Amin et al. |
| 6,564,055 B1 | | 5/2003 | Hronek |
| 6,819,921 B1 | * | 11/2004 | Mazzarella et al. ......... 455/419 |
| 2002/0156729 A1 | | 10/2002 | Nilson |
| 2003/0083991 A1 | * | 5/2003 | Kikinis ....................... 705/40 |
| 2003/0092440 A1 | | 5/2003 | Warrier et al. |
| 2003/0162525 A1 | | 8/2003 | Stefan et al. |
| 2003/0186695 A1 | | 10/2003 | Bridges et al. |
| 2005/0043012 A1 | * | 2/2005 | Benco et al. ............... 455/406 |

\* cited by examiner

*Primary Examiner*—Danh Cong Le
(74) *Attorney, Agent, or Firm*—Mark S. Walker; Streets & Steele; Jeffrey L. Streets

(57) ABSTRACT

Methods, systems and computer program products for providing roaming services to a wireless telephone roaming outside of its home service area by receiving a request for roaming service from a wireless telephone that is within a roaming network and offering a special roaming contract to the user of the wireless telephone. The request for services comprises an identify of the wireless telephone wherein the identity comprises the mobile identification number and the electronic serial number. Using the identity of the wireless telephone received in the request, the roaming network determines that the wireless telephone identity is not recorded as a record within the roaming network and is therefore roaming. The method provides offering a special roaming contract to the user and then executing the special roaming contract if the user decides to accept the offer for a special roaming contract.

34 Claims, 5 Drawing Sheets

OVERLAY CALLING PLAN FOR WIRELESS TELEPHONE

BACKGROUND OF THE INVENTION

1. Field of the Invention

This invention relates to methods for communication, and more particularly to improved methods and systems for payment of roaming charges for a mobile telephone.

2. Description of the Related Art

The use of wireless or mobile communication devices has increased greatly in recent years. Wireless communications are generally transmitted between devices by using radio frequency (RF) technology. Wireless communications include communications that are transmitted through wireless units such as cellular telephones, mobile telephones, car telephones, personal communication service (PCS) units, and pagers. Other wireless communication devices may also include, for example, appropriately equipped computers and computer peripherals.

A wireless communication device is particularly useful to a person on the move. To serve the needs of such persons, wireless communications systems have evolved into seamless roaming networks that allow wireless telephone users to receive and to initiate telephone calls both from within their "home" service network and from within a "roaming" service network. A wireless telephone roams within a roaming wireless service network whenever the wireless telephone is located outside of the geographical area that is served by its usual, or "home," wireless service network.

Numerous technical and administrative obstacles had to be overcome before a subscriber of one wireless service network could transparently receive wireless communication services from another wireless service network. For example, multilateral operating agreements had to be negotiated between service providers to standardize communications between the dissimilar switching systems of the different networks. Most importantly, definitions, common signaling protocols and common signaling message formats for exchanging and handling messages between the different switching systems had to be developed and adapted by all participating wireless service providers.

FIG. 1 is a schematic drawing that illustrates the basic components of a conventional wireless network. A basic description of a wireless telephone system is disclosed in U.S. Pat. No. 6,560,455, which is hereby fully incorporated by reference. The wireless network 100 includes a wireless telephone 114 that places or receives wireless telephone calls by transmitting and receiving RF signals through the base stations 116, 118. Typically, the wireless telephone 114 communicates with whichever base station 116, 118 provides the strongest signal.

Each base station 116, 118 transmits and receives wireless signals within a wireless communication coverage area 122, 124, often called a cell. Although only two base stations 116, 118 are depicted in FIG. 1, it should be recognized that the wireless network 100 may include many more than just two base stations. Each base station 116, 118 is connected to a Mobile Telephone Switching Office (MTSO) 126, 128 through landlines or other communication links, such as microwave communication systems. The MTSOs 126, 128 are further connected to the Public Switched Telephone Network (PSTN) 112, which is the wireline telephone system. It should be recognized that more than one base station 116, 118 is typically connected to an MTSO 126, 128.

The wireless telephone 114 shown in FIG. 1 is a conventional mobile telephone having a transceiver and an antenna that enables it to communicate with the base stations 116, 118. The MTSO 126, 128 is typically a conventional digital telephone exchange that provides wireline-to-mobile, mobile-to-wireline, and mobile-to-mobile telephone call connections. The MTSO 126, 128 also performs other functions, including, for example, receiving process status data from controllers at the base stations 116, 118 regarding the wireless telephone 114; handling and switching calls between the communication coverage areas 122, 124; processing diagnostic information; and compiling billing information. When the wireless telephone 114 passes from one communication coverage area 122 to another 124, the MTSO 126 performs a "hand-off" that allows the wireless telephone 114 to be continuously serviced in an apparent seamless manner.

The wireless network 100 identifies the wireless telephone 114, for call completion and billing purposes, by an assigned unique identity 132 that is stored in the memory of the wireless telephone 114. The identity 132 comprises a Mobile Identification Number (MIN) and an Electronic Serial Number (ESN) and may include a System Identification Code (SID). The MIN is the recognized telephone number, typically comprising an area code and a seven digit number, that is dialed by a person trying to place a telephone call to the wireless telephone 114. The MIN is assigned by the home network provider and may be easily changed at the request of the user. The ESN is assigned to the wireless unit 114 by the manufacturer and cannot be changed. The combination of the ESN and the MIN uniquely identifies each wireless telephone 114. Additionally, most providers of wireless network services within a market are assigned a SID that may be entered into the memory of the wireless unit to identify the home network service provider of the wireless telephone 114. Network service providers that have been assigned a SID typically broadcast their SID throughout their network. Then, if a wireless telephone has stored a SID in its memory, the wireless telephone can compare the SID that is being broadcast throughout the network where the wireless telephone is currently located with the SID that is stored in its memory to determine whether it is operating within its home network or whether it is operating as a roamer within a network of another service provider.

In the current North American cellular system, any given market area may be serviced by up to two competing wireless service providers, each assigned to different groups of frequencies through which services are provided. The assigned frequency sets are generally referred to as "A band frequencies" and "B band frequencies." The A band frequencies are typically reserved for the non-wireline service providers and the B band frequencies are typically reserved for the incumbent wireline service providers.

Operation of the wireless device under roaming conditions is often under the control of the wireless device user. The user may select whether the wireless device will operate in a Home System Only, A Band Only, B Band Only, A Band Preferred, or B Band Preferred operating mode. The user typically controls the system preference and mode operation through menu choice or selection. However, sometimes the home service provider may program the wireless device with a list of "negative" SID's from which the wireless device may not receive service. Negative SID's are fully disclosed in U.S. Pat. No. 4,916,728 issued to Blair and in U.S. Pat. No. 5,442,806 issued to Barber, which are hereby fully incorporated by reference.

The wireless network 100 must be capable of identifying roaming wireless telephones within its system. The wireless network 100 determines whether a wireless telephone 114 is roaming by examining the unique identity 132, which is the ESN and the MIN, of the wireless telephone 114. The wireless telephone 114 transmits its unique identity 132 to the MTSO 126, 128 during a registration process as is known in the art. The MTSO 126, 128 compares the unique identity 132 of the wireless telephone 114 with a list of unique identities contained within a Home Location Register 138 (HLR). The HLR 138 is a database used for the management of wireless telephone subscribers of the local wireless network and contains, for example, the unique identities of each subscriber, the name and address of authorized persons, billing information, and access rights to premium subscription services, such as caller ID or voice mail. If the unique identity 132 of the wireless telephone 114 is not found within the HLR 138, then the wireless network 100 determines that the wireless telephone 114 is not a subscriber to the wireless network 100, but is instead a roaming wireless telephone.

Whenever the MTSO 126, 128 determines that a wireless telephone 114 is roaming, the MTSO 126, 128 contacts the HLR 136 of the home service provider of the wireless telephone 114. The procedure for contacting the home service provider is well known in the art. By return message to the MTSO 126, 128, the home HLR 136 of the roaming wireless telephone 114 provides relevant information concerning the roaming wireless telephone 114, such as the subscriber's feature list and any calling restrictions. This information is stored in the Visitor Location Register (VLR) 134. The VLR 134 is used to identify the mobile device 114 as long as it is roaming within the wireless network 100.

Users of wireless telephones are concerned about the high charges incurred when they are using their wireless telephones in a roaming network. Roaming charges may include, for example, a base rate for roaming, any associated long distance charges, and premium per minute charges as well. Because the incurred charges for roaming are so high, many users minimize using their wireless telephones whenever they are outside of their home network. This is an inconvenience for users accustomed to using their wireless telephones on a regular basis. For those users who must use their wireless telephones while roaming, i.e., for business travelers, a high business expense is incurred.

Furthermore, it is not just the wireless telephone users that suffer from the high roaming charges. The wireless network providers are also damaged because the roaming networks lose revenues that may otherwise be collected if roaming wireless telephone users were more inclined to use their wireless telephones. If the roaming expenses charged to roaming wireless telephone users could be reduced, users of roaming wireless telephones would increase their usage, thereby increasing the revenues that would be generated for the roaming wireless service provider. Accordingly, there is a need for methods and systems that provide an efficient and cost effective means for delivering roaming services to users of roaming wireless devices.

SUMMARY OF THE INVENTION

The present invention provides methods, systems and computer program products for providing roaming services to a wireless telephone roaming outside of its home service area. In one embodiment, the method comprises receiving a request for roaming service from a wireless telephone that is within a roaming network, wherein the request comprises an identify of the wireless telephone and wherein the identity comprises a mobile identification number and an electronic serial number. Using the identity of the wireless telephone received in the request, the roaming network may determine that the wireless telephone identity is not stored as a record within the roaming network, such as, for example, the identity is not stored as a record within a visitor location register. For a wireless telephone that does not have its identity stored as a record within the roaming network, the method provides offering a special roaming contract to the user and then providing the special roaming contract if the user decides to accept the offer for a special roaming contract.

The method further provides storing the identity and terms of the special roaming contract as a record within the roaming network, such as within the visitor location register, and providing roaming services for the wireless telephone pursuant to the special roaming contract.

Alternatively, the user of a wireless telephone may decide to purchase a special roaming contract before traveling to the roaming network. In this embodiment, the method includes providing an offer for the special roaming contract to the user before the wireless telephone roams within the roaming network; optionally issuing a contract code to the user, wherein the contract code identifies the special roaming contract and may be used for security purposes; and storing the mobile identification number and optionally, the associated contract code as a record within the roaming network, such as within the visitor location register. Later, when the user travels to the roaming network with the wireless telephone, the method further includes determining that the roaming network stored a record of the mobile identification number of the wireless telephone and optionally, the associated contract code; and storing the electronic serial number of the wireless telephone in the roaming network, such as within the visitor location register.

In another embodiment, a method for roaming provides the user to obtain different roaming contracts from different roaming service providers. The method includes operating a roaming wireless telephone within a first roaming network with the wireless telephone selectively operating on a first set of unique frequencies. An offer of a special roaming contract is received by the user from a first roaming network that operates at the first set of unique frequencies. The user accepts the first special roaming contract and roams on the first roaming network under the first special roaming contract.

The method further includes switching the wireless telephone so that it operates on a second set of unique frequencies within a second roaming network that operates at the second set of unique frequencies. An offer of a special roaming contract is received by the user from the second roaming network. The user accepts the second special roaming contract and roams on the second roaming network under the second special roaming contract.

The first and second roaming contracts may provide roaming services selected from voice roaming services, data roaming services and combinations thereof. The user may switch from the wireless telephone to operate at the first or second set of unique frequencies, depending upon whether the user wants to roam under the first or second special roaming contract.

The method further provides that the user may contact the roaming networks prior to the wireless telephone entering the roaming networks. Each of the roaming networks may then provide the user with a special roaming contract.

The foregoing and other objects, features and advantages of the invention will be apparent from the following more particular description of a preferred embodiment of the invention, as illustrated in the accompanying drawing wherein like reference numbers represent like parts of the invention.

DETAILED DESCRIPTION

Figure 1:
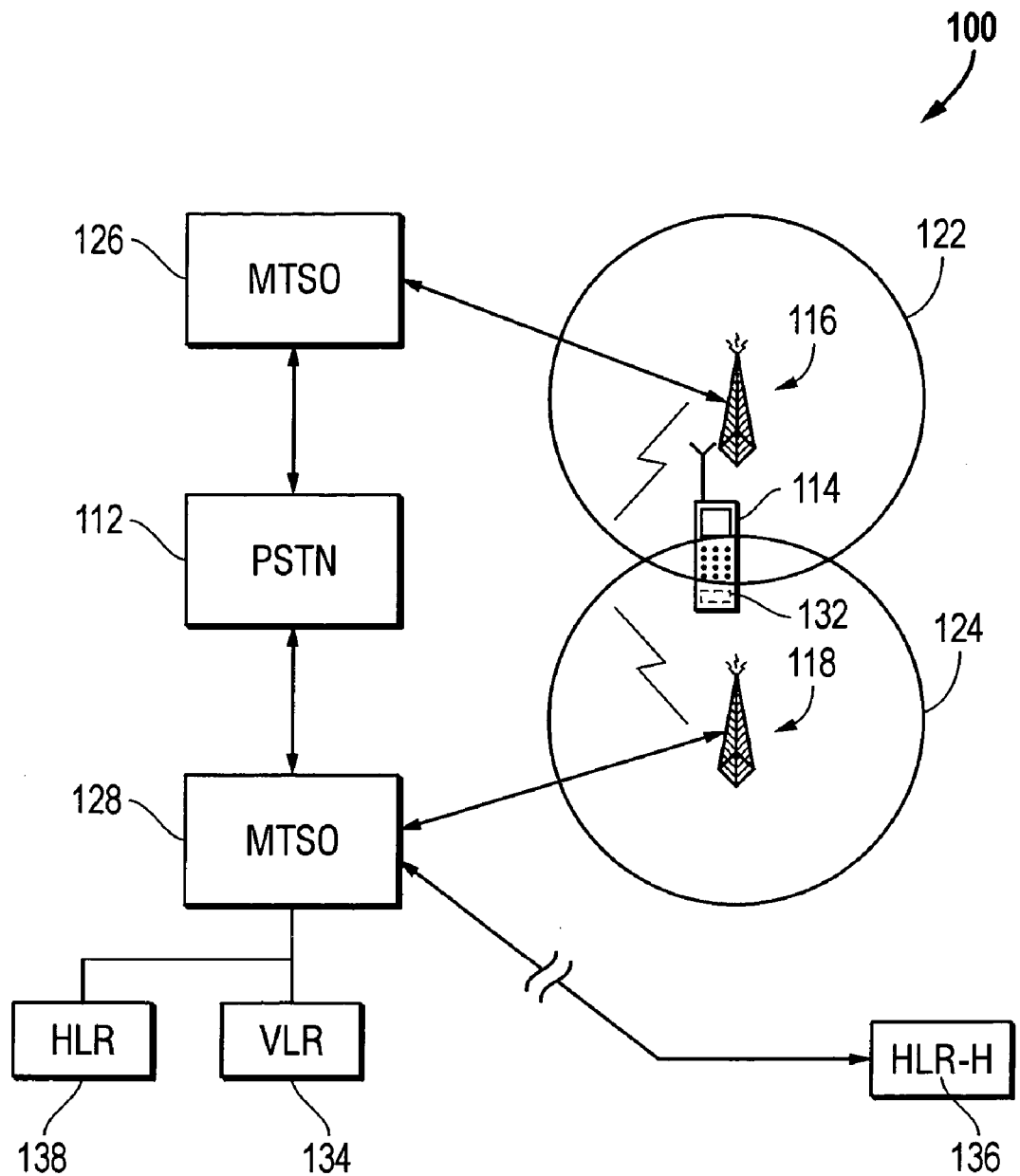
FIG. 1 is a schematic drawing that illustrates the basic components of a conventional wireless network.

The present invention provides methods, computer program products and systems for providing roaming services to a wireless telephone roaming outside of its home service area. A wireless telephone typically has the ability to roam in service areas other than its home service area, thereby allowing the wireless telephone to place and receive telephone calls while traveling. However, the roaming charges incurred while roaming are typically much higher than the costs associated with using the wireless telephone within its home service area.

Generally, the exemplary embodiments of the present invention contemplate uses with wireless units such as cellular telephones, mobile telephones and personal communication service (PCS) units that operate under the standards of Advanced Mobile Phone Service (AMPS), Call Division Multiple Access (CDMA), Global System for Mobile communications (GSM) or Time Division Multiple Access (TDMA). Nonetheless, the principles of the present invention may be applied to other communication devices operating under other standards with the appropriate reconfiguration.

In one embodiment of the present invention, the user of a wireless telephone enters into a service contract directly with a roaming network service provider, thereby contracting for roaming services at a reduced rate from the typical roaming charges. When a wireless telephone moves into a roaming network, the wireless telephone transmits its unique identity to a mobile telephone switching office (MTSO) that is part of the roaming network. The unique identity comprises the mobile identification number (MIN) and the electronic serial number (ESN). Upon checking for this unique identity within the home location register (HLR), the roaming network determines that the roaming wireless telephone is not a subscriber of the roaming network because the unique identity of the roaming wireless telephone is not contained within the HLR database of the roaming network. The HLR of the roaming network is a database that lists the unique identities of all the subscribers of the roaming network and further includes each subscriber's profile that identifies the set of features, capabilities and/or operations restrictions associated with the subscriber for roaming and local communications services. Upon determining that the wireless telephone is not a local subscriber, the roaming network may check the unique identity against a register of known roaming wireless telephones, such as may be maintained in a visitor location register (VLR).

At this point, if the wireless telephone is not registered already as a known roaming wireless telephone within the roaming network, instead of contacting the home service provider of the roaming wireless telephone for pertinent information and for authorization to grant roaming privileges, as would be typical under the prior art, the roaming service provider may contact the user of the wireless telephone directly. The contact may be made, for example, by an operator placing a telephone call to the wireless telephone and then offering the user a special roaming contract that offers substantial savings over the usual roaming charges that would be reflected on the user's home account. The special roaming contract may include, for example, a standard access plan with a pre-set number of minutes for using the roaming wireless network; access for a pre-set number of days with a set number of minutes for using the roaming wireless network; or an unlimited usage of the roaming network for a set time period. An offer to renew a special roaming contract may also be made to a user when the special roaming contract has expired or is nearing its expiration date. By default, standard roaming services that are not specifically contracted for in the special roaming contract may be made available to the user as default roaming services. These default roaming services may be provided at the prevailing roaming rate that the roaming network charges a roaming user who does not have a special roaming contract in force. The special roaming contract benefits the wireless telephone user by providing substantial savings in roaming charges and it benefits the roaming network service provider by increasing its revenues generated from the increased numbers of users that use the roaming services at the lower roaming rates.

If the user executes a special roaming contract with the roaming service provider, the user tenders a credit card, debit card or other agreed method of payment for the special roaming contract. Additional premium services may also be purchased with the contract, including, for example, call waiting, voice mail, and caller ID. The unique identity of the wireless telephone is then entered into the visitor location register (VLR), or other suitable database of the roaming network, with the associated special roaming contract terms. The information in the VLR will then identify the wireless telephone, with its associated special roaming contract, as long as the wireless telephone remains within the roaming network or for the life of the contract.

Alternatively, the user may purchase a special roaming contract before entering the roaming network. If the user is planning a trip to another area, the user may choose to contact a wireless service provider to purchase a special roaming contract before leaving on the trip. If the user has a home service provider that has programmed negative SID's into the user's wireless telephone, then the user typically will not contact those service providers for a special roaming contract unless the negative SID's may be removed. The user may contact the roaming service provider in the area to which the user will be traveling by, for example, using a personal computer having a browser connected to the Internet, by telephone to a sales representative of the roaming service provider, or by telephone to an automated system that allows user input through voice commands or through the touchtone dialing of a telephone as is available with an Interactive Voice Response System (IVRS). Optionally, the user may contact the roaming service provider in person, such as, for example, in a face-to-face meeting with a sales representative of the roaming service provider.

If the user's wireless telephone can select a particular roaming service provider from all the providers available in a roaming area, for example by switching the wireless telephone to A Band Only or B Band Only, as previously discussed, the wireless telephone user can contract with more than one roaming network provider. For example, one roaming network provider operating on the A Band may provide a special roaming contract for data and another roaming network provider operating on the B Band may provide a special roaming contract for voice. The user may then switch from one band to the other depending on whether the user needs voice or data roaming services.

If the user purchases the special roaming contract before the wireless telephone enters the roaming network, then the mobile identification number may be entered into the VLR, or other suitable database of the roaming network, along with the pertinent contract provisions and optionally, a contract code that is issued to the user when the contract is executed. The contract code may be used as an optional security procedure to ensure that the proper wireless telephone is being matched to a previously executed special roaming contract. Then when the wireless device enters the roaming network for the first time, during the registration process, the mobile identification number may be found in the VLR and optionally, for the first time only, the user may be prompted to enter the contract code using, for example, the keypad of the wireless telephone. The combination of the mobile identification number (MIN) and the contract code provides identification of the wireless telephone as the one having a special roaming contract. However, if the optional contract code is not used, then the browsing wireless telephone may be matched to the previously executed contract by the MIN of the wireless telephone alone. The missing part of the unique identity, i.e., the electronic serial number, is added to the VLR or other suitable database within the roaming network, after being captured from the wireless telephone during the registration process. The information in the VLR will identify the wireless telephone, with its associated contract, as long as the wireless telephone remains within the roaming network or for the life of the contract. The optional contract code does not serve a security purpose after the roaming network has had the opportunity to capture the electronic serial number from the wireless telephone and thereby complete the unique identity of the wireless telephone.

Figure 2:
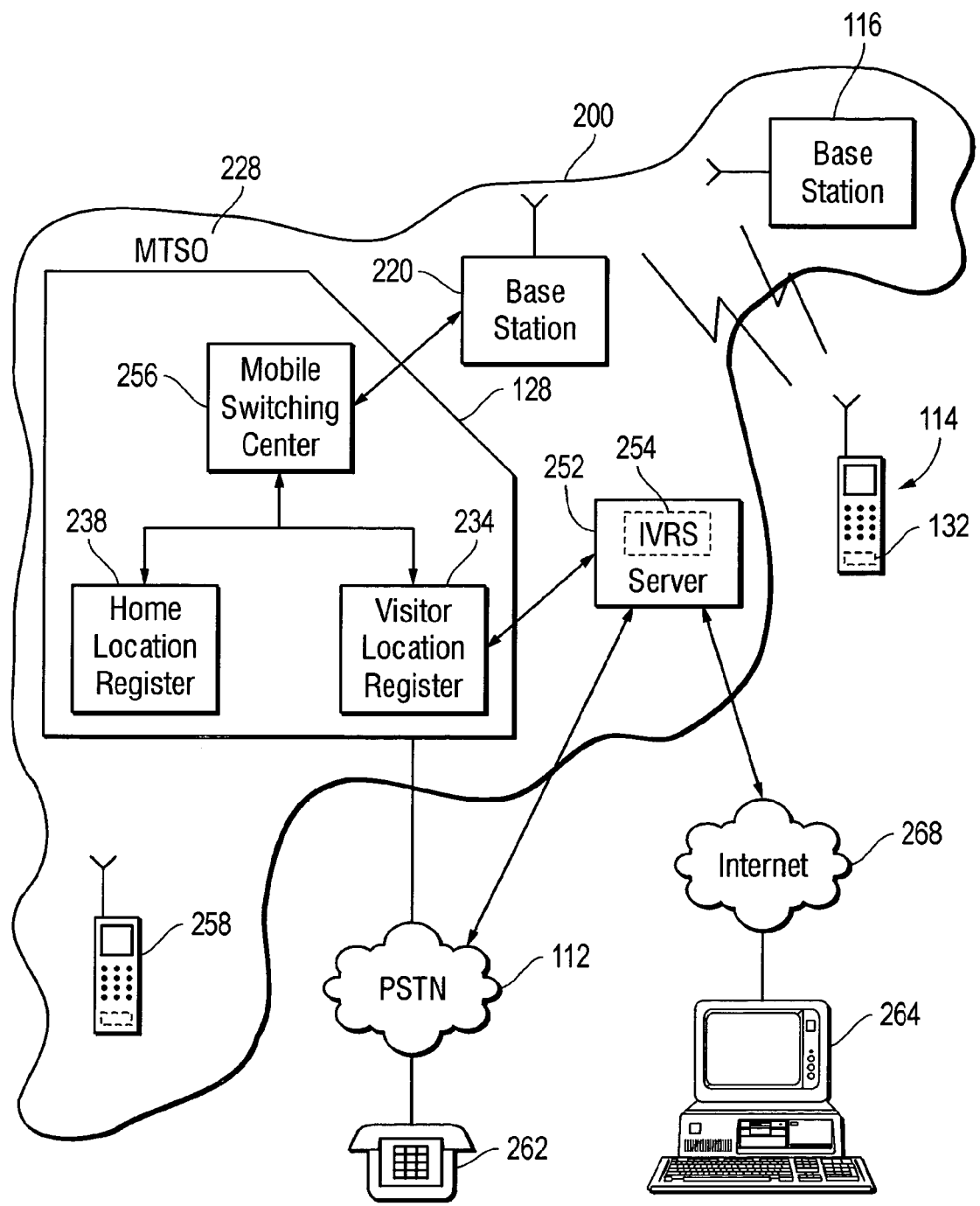
FIG. 2 is a schematic drawing of an exemplary system capable of implementing an exemplary embodiment of the present invention.

FIG. 2 is a schematic drawing of an exemplary system capable of implementing an embodiment of the present invention. A wireless telephone 114 is shown entering a roaming service area 200. As the wireless telephone 114 enters the roaming service area 200, or when the wireless telephone 114 is powered on within the roaming service area 200, the wireless telephone 114 registers with the mobile telephone switching office (MTSO) 228 by methods well known in the art. The registration process is accomplished by sending the unique identity 132 of the wireless telephone 114 through the base station 220 to the MTSO 228. The unique identity 132, as previously disclosed, includes the electronic serial number (ESN) and the mobile identification number (MIN) of the wireless telephone 114.

The MTSO 228 comprises a set of modular hardware and software components designed to administer the allocation of radio channels with the roaming service area 200, and to coordinate the paging of wireless telephones, including wireless telephone 114, for incoming calls to the wireless telephones. The MTSO 228 also coordinates the hand-off of in-progress calls from one base station 220 to another. It should be noted that a typical wireless network, like roaming network 200, may have a plurality of base stations and MTSOs, such as base station 220 and MTSO 228.

One of the modular components of the MTSO 228 is the mobile switching center (MSC) 256. The MSC 256 is typically a processor-controlled software-driven switching system arranged to provide seamless communications paths by bridging radio channels and wired channels for calls routed over the roaming network 200 and the public switched telephone network (PSTN) 112, which is the wireline telephone system. The MSC 256 plays a significant role in the registration process mentioned above. Specifically, the MSC 256 receives a registration request message from the base station 220 regarding the registration of the wireless telephone 114 when the wireless telephone 114 first enters the roaming network 200 or when the wireless telephone 114 is first powered on within the roaming network 200. The registration request includes the ESN and the MIN, the component parts of the unique identity 132 of the wireless telephone 114. The MSC 256 sends the request to the home location register 238 and the visitor location register 234, which searches for the unique identity 132 within the VLR 234 or HLR 238 to determine whether the wireless telephone 114 is roaming or is a subscriber wireless telephone. The visitor location register 234 is a database facility that is used to retrieve information for handling communications services requests from a roaming wireless telephone 114.

After the MTSO 228 has determined that the wireless telephone 114 is roaming, contact is made with the user of the wireless telephone 114 by calling the wireless telephone. The call may be placed by an operator using a wireline telephone 262 or using a wireless telephone 258. Alternatively, communication between the roaming network 200 and the user of the wireless telephone 114 may be made by recorded messages delivered to the wireless telephone 114 from a computer, such as a server 252, and by touchtone dialing of the wireless telephone 114 by the user to input information to the computer. Alternatively, the user may input information or commands to the server 252 through voice commands spoken over the telephone 114. In one embodiment, an Interactive Voice Response System (IVRS) 254, a computer application program installed on the server 254, is used for communication over the roaming network 200 with the user of the wireless telephone 114.

Specifically, IVRS 254 is an application program that may be run on the server 254 that plays pre-recorded speech phrases to guide the user of the wireless telephone 114 through the roaming contract execution process. Therefore, for example, after retrieving the mobile identification number of the wireless telephone 114, the IVRS 254 may insert this information in a pre-set format for conveying roaming contract information to the user of the wireless telephone 114. Also included in the IVRS 254 is a means to respond to touch-tone dialing commands or to voice commands spoken by the user that may be delivered by the user of the wireless telephone 114, such as for the selection of a special roaming contract, a time period desired for the contract, and a credit card or debit card number for paying for the contract.

Alternatively, before the wireless telephone 114 travels to the roaming network 200, the user of the wireless telephone may contact the server 252 through the Internet 268 using a browser on a personal computer 264, as is well known in the art. Interacting with the server 252, the user may then choose a special roaming contract that would be suitable for the user's needs. Furthermore, the user may contact the server 252 through a wireline telephone 262 and use the IVRS 254 capability of the server 252 to select a suitable special roaming contract or speak with an operator to select a suitable special roaming contract.

Figure 3A:
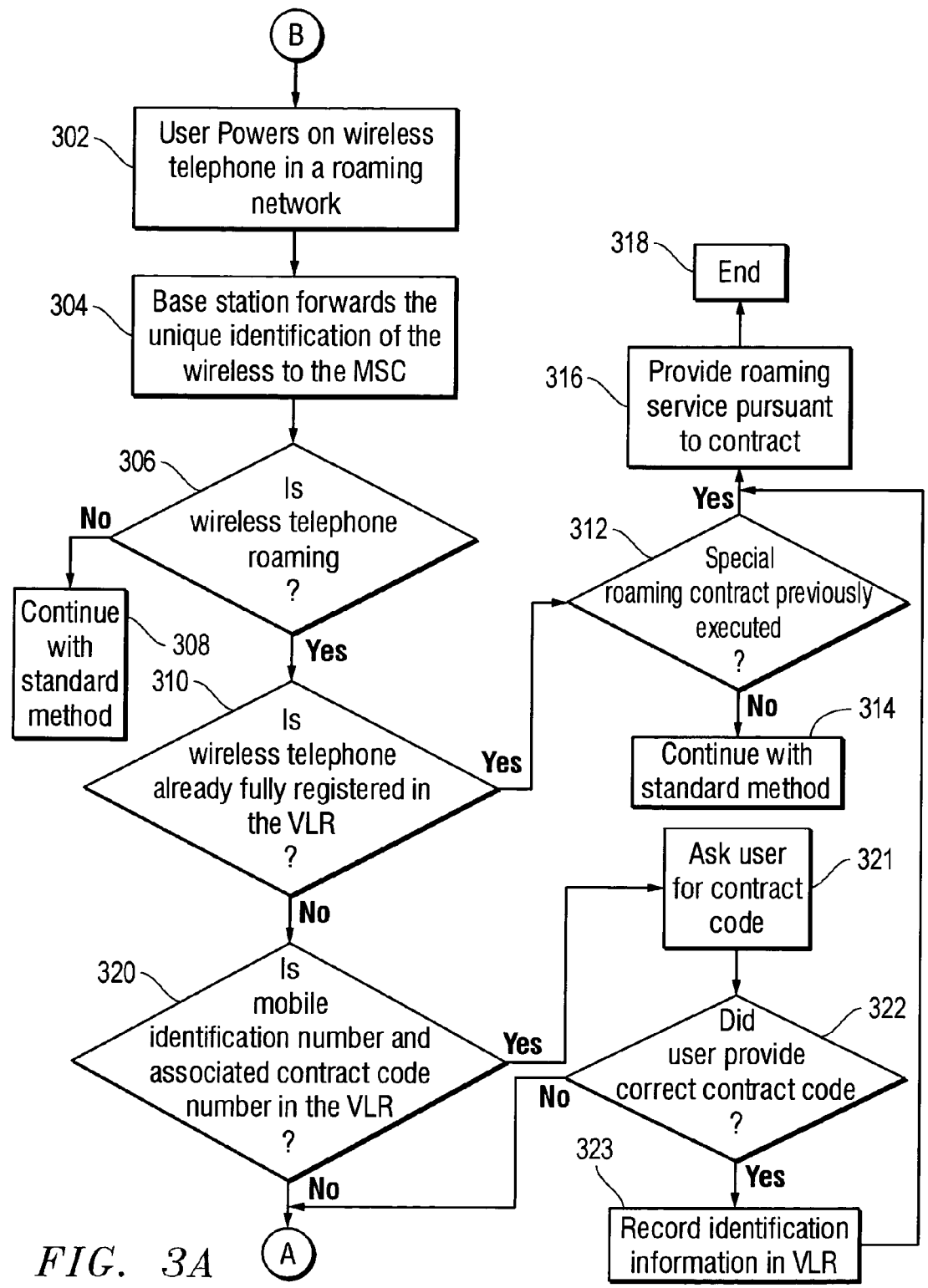
FIGS. 3A–3B are a flowchart of an exemplary method that may be implemented in accordance with the present invention.
Figure 3B:
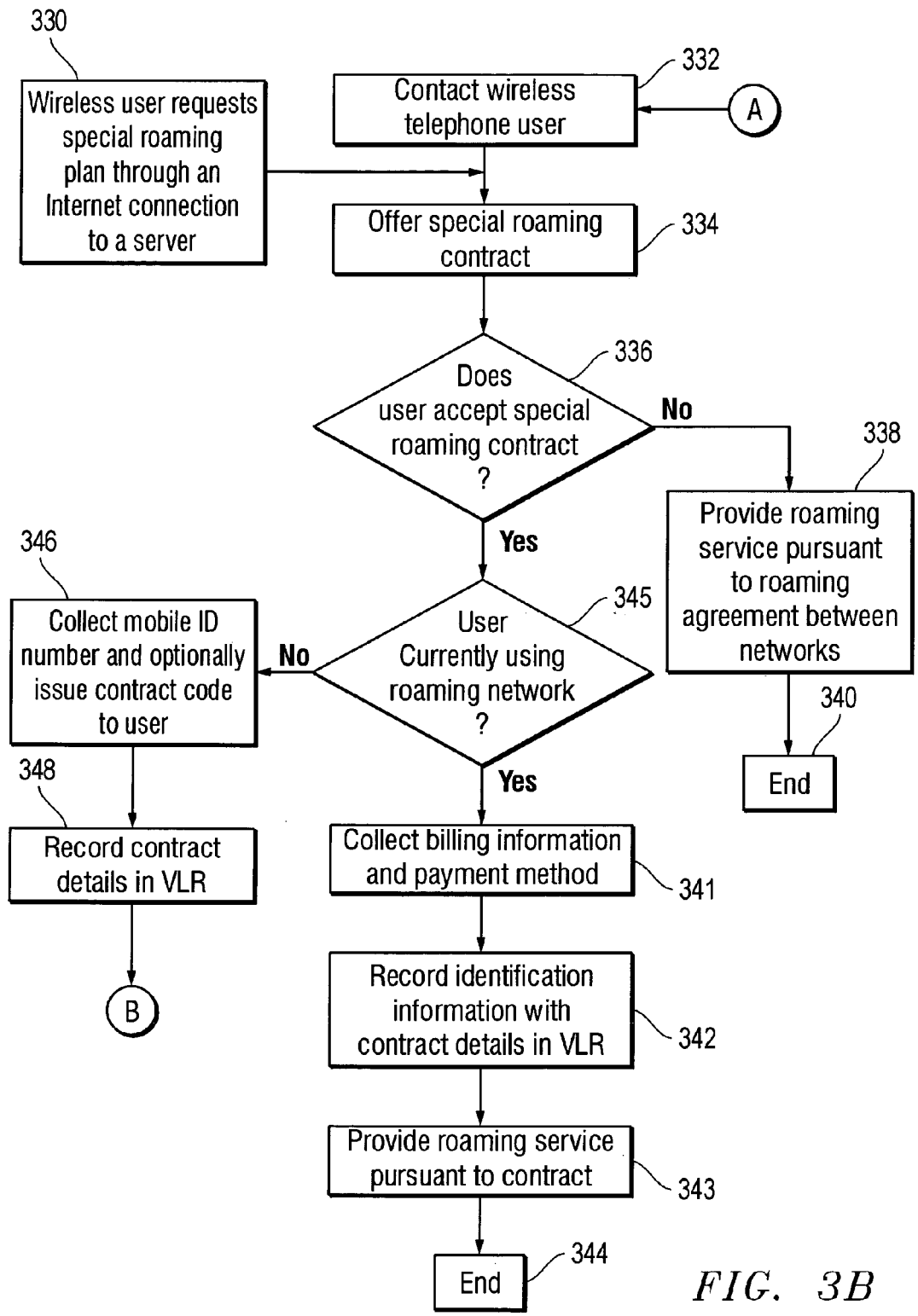

FIGS. 3A–3B are a flowchart of an exemplary method that may be implemented in accordance with the present invention. In state 302, a wireless telephone user powers on a wireless telephone within a roaming network. Alternatively, the user may enter the roaming network with the wireless telephone. In state 304, the base station forwards the unique identity of the wireless telephone to the MSC. In state 306, the MSC determines whether the wireless telephone is roaming. If, in state 306, the MSC determines that the wireless telephone is not roaming, but is a local subscriber, then in state 308, the method continues as the standard method of the roaming network. If, in state 306, the MSC determines that the wireless telephone is roaming, then in state 310, the MSC determines whether the wireless telephone is already fully registered in the roaming network as, for example, within the visitor location register. (VLR). To be fully registered, both the mobile identification number (MIN) and the electronic serial number (ESN) must be recorded in the VLR. If, in state 310, the MSC determines that the wireless telephone is already fully registered in the VLR, then in state 312, the MSC determines whether the wireless telephone chose to execute a special roaming contract. If, in state 312, the MSC determines that the wireless telephone chose not to execute a special roaming contract, then in state 314, the method continues as the standard method of the roaming network. If, in state 312, the wireless telephone did previously choose to execute a special roaming contract, then in state 316, the roaming network service provider provides roaming services pursuant to the executed special roaming contract and in state 318, the method ends.

If, in state 310, the wireless telephone is not already fully registered in the VLR, then in state 320, the MSC determines whether the mobile identification number (MIN) is registered with an associated contract code in the VLR. This step identifies a user or a wireless device that has purchased a special roaming contract before the wireless telephone makes contact with the roaming network. If, in state 320, the MSC determines that the MIN and optionally, the associated contract code are recorded in the VLR, then in optional state 321, the user of the wireless telephone is asked to provide the contract code. If, in state 322, it is determined that the contract code was correct, then in state 323, the ESN of the wireless device is recorded in the VLR to fully register the wireless telephone. The method then proceeds to state 316, and the wireless telephone is provided with roaming service pursuant to the special roaming contract and, in state 318, the method ends. Alternatively, if the optional contract code is not used, upon determining in state 320 that a MIN alone is associated with a previously executed contract, then the method may proceed directly to state 323.

If, in state 322, the user cannot provide the correct optional contract code, or if, in state 320, the MIN is not recorded in the VLR or optionally, is not recorded in the VLR with the associated contract code, then the method proceeds to state 332 on FIG. 3B.

In state 332, contact is made with the user of the wireless telephone by calling the wireless telephone. In state 334, the user is offered a special roaming contract. The offer may be made by an operator discussing the various calling plans available with the user or the offer may be made through an Interactive Voice Response System as discussed above. After the offer has been made, in state 336, the user decides whether to accept a special roaming contract. If, in state 336, the user decides not to accept a special roaming contract, then in state 338, the wireless telephone is provided with roaming service pursuant to any roaming agreements between the roaming network service provider and the wireless telephone's home service provider and in state 340, the method ends.

If, in state 336, the user decides to accept a special roaming contract, then in state 345, it is determined that the user is currently using the roaming network, so in state 341, billing information and method of payment information is collected from the user. In state 342, the unique identity of the wireless telephone is recorded within the VLR with the associated details of the special roaming contract. In state 343, roaming services are provided to the wireless telephone pursuant to the special roaming contract and in state 344, the method ends.

The wireless telephone user may, in state 330, decide to request a special roaming contract before traveling to the roaming network. The request may be made through a telephone call to an operator or through an Interactive Voice Response System. The request may also be made by contacting a server through the Internet using a browser on a personal computer. The method proceeds through states 334 and 336 as discussed above. If, in state 345 it is determined that the user is currently not using the roaming network, then in state 346, the user is requested to provide the MIN of the wireless telephone and optionally, a contract code is issued to the user to identify the wireless telephone and the user when the wireless telephone travels to the roaming network. In state 348, the special roaming contract details are recorded in the VLR with the MIN and the contract code. The method then continues to step 302 as discussed above.

Figure 4:
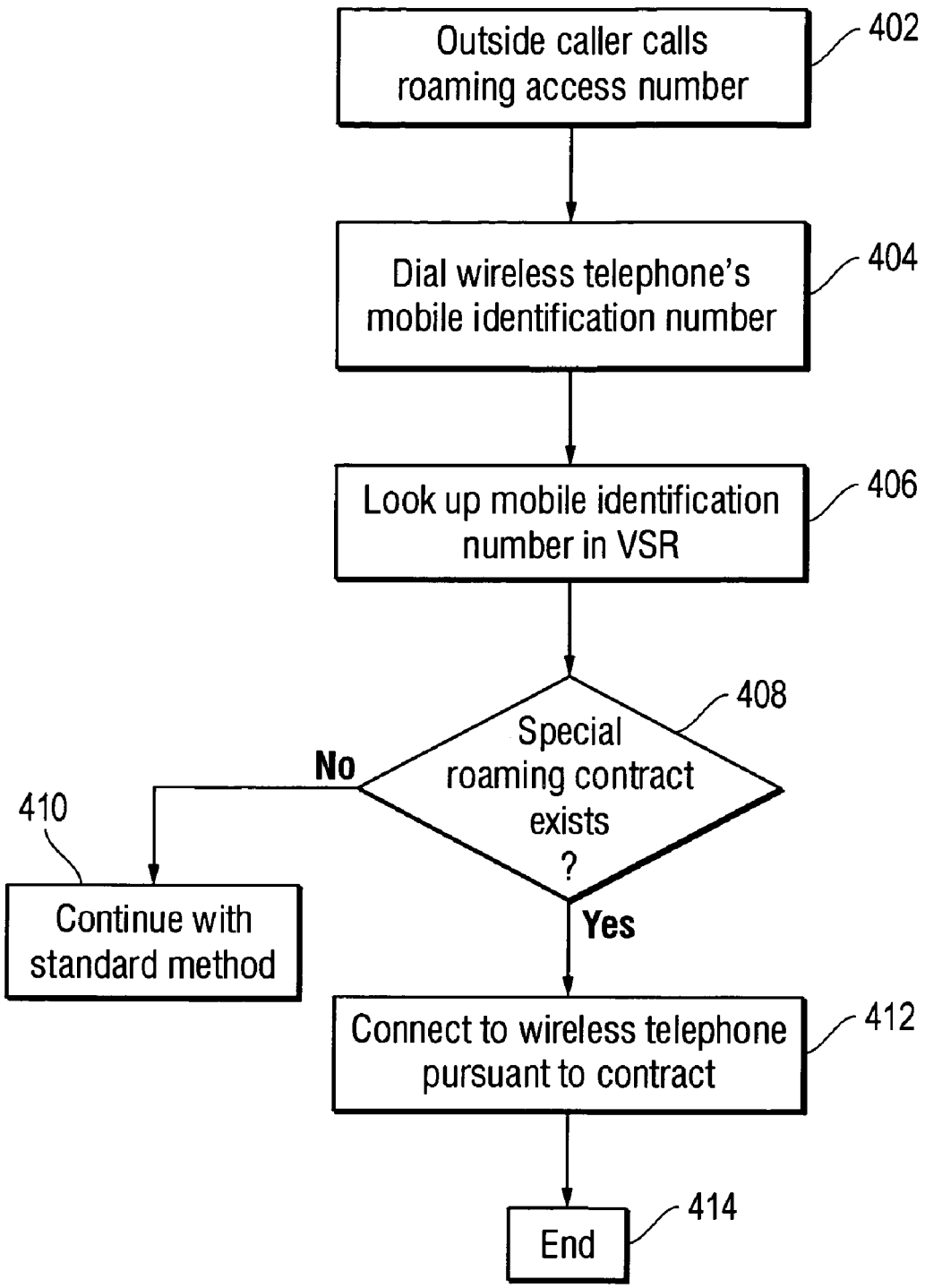
FIG. 4 is a flowchart of an exemplary method of placing a telephone call to a roaming mobile telephone in accordance with the present invention.

FIG. 4 is a flowchart of an exemplary method of placing a telephone call to a roaming mobile telephone in accordance with the present invention. In state 402, an outside caller calls the roaming access number associated with the roaming network. In state 404, the outside caller dials the mobile identification number of the wireless telephone. In state 406, the MTSO searches the VLR for the mobile identification number. If, in state 408, there is a special roaming contract associated with the MIN, then in state 412, the telephone call is connected to the wireless telephone pursuant to the terms of the special roaming contract and in state 414, the method ends. If, in state 408, there is no special roaming contract associated with the MIN, then in state 410, the roaming network continues with its standard method.

It will be understood from the foregoing description that various modifications and changes may be made in the preferred embodiment of the present invention without departing from its true spirit. It is intended that this description is for purposes of illustration only and should not be construed in a limiting sense. The scope of this invention should be limited only by the language of the following claims.

What is claimed is:

1. A method for roaming, comprising:
   receiving a request for roaming service from a wireless telephone within a roaming network, wherein the request comprises an identity of the wireless telephone and wherein the identity comprises a mobile identification number and an electronic serial number;
   determining that the identity is not stored as a record within the roaming network,
   offering a special roaming contract to a user of the wireless telephone;
   providing the special roaming contract to the user;
   storing the identity and terms of the special roaming contract within the roaming network; and providing roaming service for the wireless telephone pursuant to the special roaming contract.

2. The method of claim 1, further comprising:
providing an offer for the special roaming contract before the wireless telephone roams within the roaming network;
storing the mobile identification number within the roaming network.

3. The method of claim 2, further comprising:
issuing a contract code to the user, wherein the contact code identifies the special roaming contract; and
storing the contract code associated with the mobile identification number within the roaming network.

4. The method of claim 3, after the step of storing the contract code, the method further comprises:
determining that the roaming network contains the mobile identification number of the wireless telephone and the associated contract code;
storing the electronic serial number of the wireless telephone in the roaming network.

5. The method of claim 3, wherein the contract code is selected from numbers, letters, words and combinations thereof.

6. The method of claim 2, after the step of storing the mobile identification number, the method further comprises:
determining that the roaming network contains the mobile identification number of the wireless telephone; and
storing the electronic serial number of the wireless telephone in the roaming network.

7. The method of claim 2, wherein the offer for the special roaming contract is provided over a telephone, over the wireless telephone, over a personal computer, in person, and from combinations thereof.

8. The method of claim 2, wherein the offer for the special roaming contact is provided through an interactive voice response system.

9. The method of claim 1, wherein the offer of a special roaming contract is provided through an interactive voice response system.

10. The method of claim 1, wherein the special roaming contract comprises contact roaming rates for the wireless telephone.

11. The method of claim 1, further comprising:
providing default roaming services at a prevailing default roaming service rate.

12. The method of claim 1, further comprising;
offering a renewal of the special roaming contract, wherein the renewal contract extends a contracted service term for a longer period.

13. A computer program product, comprising:
receiving instructions for receiving a request for roaming service from a wireless telephone that is within a roaming network, wherein the request comprises an identity of the wireless telephone and wherein the identity comprises a mobile identification number and an electronic serial number;
determining instructions for determining that the identity is not stored as a record within the roaming network;
offering instructions for offering a special roaming contract to a user of the wireless telephone;
providing instructions for providing the special roaming contract to the user;
storing instructions for storing the identity and terms of the special roaming contract within the roaming network; and providing instructions for providing roaming service for the wireless telephone pursuant to the special roaming contract.

14. The computer program product of claim 13, further comprising:
providing instructions for providing an offer for the special roaming contract before the wireless telephone roams within the roaming network;
storing instructions for storing the mobile identification number within the roaming network.

15. The computer program product of claim 14, further comprising:
issuing instructions for issuing a contract code to the user, wherein the contact code identifies the special roaming contract; and
storing instructions for storing the contact code associated with the mobile identification number within the roaming network.

16. The computer program product of claim 15, after the step of storing instructions for storing a contract code, the computer program product further comprises:
determining instructions for determining that the roaming network contains the mobile identification number of the wireless telephone and the associated contract code; and
storing instructions for storing the electronic serial number of the wireless telephone in the roaming network.

17. The computer program product of claim 15, wherein the contract code is selected from numbers, letters, words and combinations thereof.

18. The computer program product of claim 14, after the step of storing instructions for storing the mobile identification number within the roaming network, the computer program product further comprises:
determining instructions for determining that the roaming network contains the mobile identification number of the wireless telephone; and
storing instructions for storing the electronic serial number of the wireless telephone in the roaming network.

19. The computer program product of claim 14, wherein the providing instructions for providing an offer comprise:
providing instructions for providing the offer over a telephone, over the wireless telephone, over a personal computer, in person and from combinations thereof.

20. The computer program product of claim 14, wherein the providing instructions for providing an offer further comprise instructions for an interactive voice response system.

21. The computer program product of claim 13, wherein the offering instructions for offering a special roaming contract further comprise instructions for an interactive voice response system.

22. The computer program product of claim 13, wherein the special roaming contract comprises contract roaming rates for the wireless telephone.

23. The computer program product of claim 13, further comprising:
providing instructions for providing default roaming services at a prevailing default roaming service rate.

24. The computer program product claim 13, further comprising;
offering instructions for offering a renewal of the special roaming contract, wherein the renewal contract extends a contracted service term for a longer period.

25. A system, comprising:
means for receiving a request for roaming service from a wireless telephone that is within a roaming network, wherein the request comprises an identity of the wireless telephone and wherein the identity comprises a mobile identification number and an electronic serial number;

means for determining that the identity is not stored as a record within the roaming network;

means for offering a special roaming contract to a user of the wireless telephone;

means for providing the special roaming contract to the user;

means for storing the identity and terms of the special roaming contract within the roaming network; and means for providing roaming service for the wireless telephone pursuant to the special roaming contract.

26. The system of claim 25, further comprising:

means for providing an offer for the special roaming contract to the user before the wireless telephone roams within the roaming network;

means for storing the mobile identification number within the roaming network.

27. The system of claim 26, further comprising:

means for issuing a contract code to the user, wherein the contract code identifies the special warning contract; and means for storing the contract code associated with the mobile identification number within the roaming network.

28. The system of claim 27, further comprising:

means for determining that the roaming network contains the mobile identification number of the wireless telephone and the associated contract code;

means for storing the electronic serial number of the wireless telephone in the roaming network.

29. The system of claim 27, wherein the contract code is selected from numbers, letters, words and combinations thereof.

30. The system of claim 26, further comprising:

means for determining that the roaming network contains the mobile identification number of the wireless telephone, and means for storing the electronic serial number of the wireless telephone in the roaming network.

31. The system of claim 26, wherein the means for providing an offer for a contract are selected from means for providing an offer over a telephone, means for providing an offer over the wireless telephone, means for providing an offer over a personal computer, and combinations thereof.

32. The system of claim 25, wherein the special roaming contract comprises contract roaming rates for the wireless telephone.

33. The system of claim 25, further comprising:

means for providing default roaming services at a prevailing default roaming service rate.

34. The system of claim 25, further comprising;

means for offering a renewal of the special roaming contract, wherein the renewal contract extends a contracted service term for a longer period.

* * * * *